United States Patent [19]
Adachi

[11] Patent Number: 4,939,367
[45] Date of Patent: Jul. 3, 1990

[54] RECORDING AND READ-OUT APPARATUS

[75] Inventor: Yuuma Adachi, Kanagawa, Japan

[73] Assignee: Fuji Photo Film Co., Ltd., Kanagawa, Japan

[21] Appl. No.: 298,817

[22] Filed: Jan. 18, 1989

Related U.S. Application Data

[63] Continuation of Ser. No. 903,167, Sep. 3, 1986, abandoned.

[30] Foreign Application Priority Data

Sep. 3, 1985 [JP] Japan .................. 60-194218

[51] Int. Cl.$^5$ .............................. G03B 42/02
[52] U.S. Cl. .................. 250/327.2; 250/484.1
[58] Field of Search ............... 250/327.2 D, 327.2 E, 250/327.2 F, 327.2 G, 484.1 B

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,335,315 | 6/1982 | Waerve et al. | 378/197 |
| 4,387,428 | 6/1983 | Ishida et al. | 364/413.13 |
| 4,400,619 | 8/1983 | Kotera et al. | 250/327.2 |
| 4,611,247 | 9/1986 | Ishida et al. | 358/280 |
| 4,620,098 | 10/1986 | Fujiwara | 250/327.2 |
| 4,816,676 | 3/1989 | Aagano | 250/327.2 |

FOREIGN PATENT DOCUMENTS 56-11395 2/1981 Japan .................. 250/327.2

Primary Examiner—Constantine Hannaher
Attorney, Agent, or Firm—Sughrue, Mion, Zinn, Macpeak & Seas

[57] ABSTRACT

A radiation image recording and read-out apparatus comprises a system for circulating and conveying many stimulable phosphor sheets, a section for recording a radiation image on the stimulable phosphor sheets, a section for scanning the respective stimulable phosphor sheets with stimulating rays and reading out the radiation image stored thereon, and a section for erasing radiation energy remaining on the stimulable phosphor sheets. The scanning size is adjusted based on a scanning size designation signal. A control section is provided for storing combinations of image recording menus with scanning sizes and sending the scanning size designation signal corresponding to a designated image recording menu to the image read-out section. The image recording section may be provided with a device for adjusting an irradiation field to a region on the stimulable phosphor sheet, where the scanning is conducted, based on the scanning size designation signal.

10 Claims, 3 Drawing Sheets

RECORDING AND READ-OUT APPARATUS

This is a continuation, of application Ser. No. 06/903,167 filed Sep. 3, 1986.

BACKGROUND OF THE INVENTION

1. Field of the Invention

This invention relates to a radiation image recording and read-out apparatus for exposing individual stimulable phosphor sheets to a radiation passing through an object to have a radiation image of the object stored thereon, exposing the individual stimulable phosphor sheets to stimulating rays which cause them to emit light in proportion to the stored radiation energy, and detecting and converting the emitted light into electric signals. This invention particularly relates to a radiation image recording and readout apparatus in which the stimulable phosphor sheets are circulated and reused for recording radiation images.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet comprising the stimulable phosphor (hereinafter referred to as a stimulable phosphor sheet or simply as a sheet) is first exposed to a radiation passing through an object to have a radiation image stored thereon, and is then scanned with stimulating rays which cause it to emit light in proportion to the radiation energy stored. The light emitted by the stimulable phosphor sheet when the sheet is exposed to the stimulating rays is photoelectrically detected and converted into an electric image signal, which is processed as desired to reproduce a visible image having an improved image quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects respectively on the stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining on the stimulable phosphor sheet after it is scanned with stimulating rays to read out the radiation image stored thereon should be erased by exposure to light or heat as described, for example, in U.S. Pat. No. 4,400,619 or Japanese Unexamined Patent Publication No. 56(1981)-12599. The stimulable phosphor sheet should then be used again for radiation image recording.

From the aforesaid viewpoint, the applicant proposed in Japanese Unexamined Patent Publication No. 59(1984)-192240 a built-in type radiation image recording and read-out apparatus comprising:

(i) a circulation and conveyance means for conveying at least one stimulable phosphor sheet for recording a radiation image thereon along a predetermined circulation path, (ii) an image recording section positioned on said circulation path for recording a radiation image of an object on said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned with said stimulating rays to obtain an electric image signal, and (iv) an erasing section positioned on said circulation path for, prior to the next image recording on said stimulable phosphor sheet for which the image read-out has been conducted at said image read-out section, having said stimulable phosphor sheet release the radiation energy remaining on said stimulable phosphor sheet, whereby said stimulable phosphor sheet is circulated through said image recording section, said image read-out section and said erasing section and reused for radiation image recording.

In the aforesaid radiation image recording and read-out apparatus, recording and read-out of radiation images can be conducted continuously and efficiently.

However, in the aforesaid radiation image recording and read-out apparatus, since stimulable phosphor sheets of a fixed size are circulated and reused in the apparatus, it is normally impossible to select the sheet size in accordance with the image recording portion of the object and/or the image recording method. Therefore, it occurs that an image of a small image recording portion is recorded at a part of a stimulable phosphor sheet of a large size and a markedly broad background portion (a direct radiation impingement region) is recorded around the image of the small image recording portion, or an object portion not related to diagnosis is broadly recorded around an object portion related to diagnosis. When the image read-out is conducted also for the background portion or the portion not related to diagnosis, the time required for the image read-out becomes unnecessarily long.

Accordingly, the operator of the apparatus is required to store the type of image recording conducted on each stimulable phosphor sheet in the memory, and adjust the image read-out size to an appropriate value based on the memory at the time of the image read-out. However, such work is very troublesome, and becomes a great burden to the operator of the apparatus.

SUMMARY OF THE INVENTION

The primary object of the present invention is to provide a radiation image read-out apparatus wherein image read-out size can be adjusted to the minimum size necessary in accordance with the image recording portion of the object of the like by a simple operation.

Another object of the present invention is to provide a radiation image recording and read-out apparatus which shortens the time required for image read-out.

The specific object of the present invention is to provide a radiation image recording and read-out apparatus which eliminates unnecessary exposure of an object to a radiation.

The present invention provides a radiation image recording and read-out apparatus provided with:

(i) a circulation and conveyance means for conveying a plurality of stimulable phosphor sheets for recording a radiation image thereon along a predetermined circulation path, (ii) an image recording section positioned on said circulation path for recording a radiation image of an object on each of said stimulable phosphor sheets by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned by said stimulating rays to obtain an electric image signal, and (iv) an erasing section positioned on said circulation path for, prior to the next image recording on said stimulable phosphor sheet for which the image read-out has been conducted at said image read-out section, having said stimulable phosphor sheet release the radiation energy remaining on said stimulable phosphor sheet, wherein the improvement comprises:

(v) constituting said image read-out section so that a stimulating ray scanning size with respect to said stimulable phosphor sheet is changeable, and said image readout section receives a scanning size designation signal and adjusts said stimulating ray scanning size to a scanning size represented by said scanning size designation signal, and (vi) providing a control section for storing combinations of image recording menus with stimulating ray scanning sizes in a storage means, receiving a signal representing one of said image recording menus, reading the scanning size corresponding to said image recording menu represented by said signal from said storage means, and sending a signal representing said scanning size as said scanning size designation signal to said image read-out section.

The present invention also provides a radiation image recording and read-out apparatus provided with the circulation and conveyance means, the image recording section, the image read-out section, and the erasing section as mentioned above, wherein the improvement comprises:

constituting said image read-out section so that a stimulating ray scanning size with respect to said stimulable phosphor sheet is changeable, and said image read-out section receives a scanning size designation signal and adjusts said stimulating ray scanning size to a scanning size represented by said scanning size designation signal, providing said image recording section with an irradiation field adjusting means for adjusting an irradiation field to a region on said stimulable phosphor sheet where said scanning with said stimulating rays is conducted, and providing a control section for storing combinations of image recording menus with stimulating ray scanning sizes in a storage means, receiving a signal representing one of said image recording menus, reading the scanning size corresponding to said image recording menu represented by said signal from said storage means, and sending a signal representing said scanning size as said scanning size designation signal to said image read-out section.

Normally, the object image recording range on the stimulable phosphor sheet is approximately fixed by an image recording menu such as the image recording portion of the object and an image recording method. Therefore, it becomes possible to adjust the image read-out size to the minimum required size suitable for respective radiation images when combinations of image recording menus with stimulating ray scanning sizes (i.e. the image read-out sizes) suitable for the respective image recording menus are stored in the storage means and the stimulating ray scanning size corresponding to an image recording menu specified for a stimulable phosphor sheet is read from the storage means and adjusted. In this case, it is only necessary for the operator of the apparatus to enter information on the image recording menu to the control section, for example, by operating keys on an operating console.

In the present invention, the start point of scanning may be adjusted at the same position for all stimulating ray scanning sizes, or may be adjusted at different positions in accordance with the respective stimulating ray scanning sizes. In the latter case, it becomes possible to adjust the image recording position on the stimulable phosphor sheet as desired for each image recording menu. Specifically, it becomes possible, for example, to make the center of the image recording area (which coincides with the center of a scanning surface in the image read-out carried out later) coincide with the center of the stimulable phosphor sheet for all image recording menus. As a result, positioning of the object in the image recording step is facilitated.

In the radiation image recording and read-out apparatus of the present invention mentioned last, it is possible to adjust the irradiation field at the region, where scanning with stimulating rays is carried out, by use of the irradiation field adjusting means. In this case, there is no risk of the stimulable phosphor sheet being exposed to a radiation over an area larger than the region where the radiation image is actually read out. As a result, it becomes possible to decrease the radiation dose to the object.

With the radiation image recording and read-out apparatus in accordance with the present invention, since there is no risk of unnecessary image read-out being carried out, it is possible to shorten the time required for the image read-out. Further, in order to obtain the effects of the radiation image recording and read-out apparatus in accordance with the present invention, since it is only necessary for the operator of the apparatus to enter the image recording menu, the burden to the operator is relieved markedly as compared with the case where the image read-out region is changed manually.

Also, when the radiation image recording and read-out apparatus in accordance with the present invention is constituted so that the starting point of scanning with stimulating rays is changeable for respective image recording menus, it becomes possible to adjust the center of the image recording area on the stimulable phosphor sheet as desired for the respective image recording menus, and to facilitate positioning of the object in the image recording step. Further, with the radiation image recording and read-out apparatus in accordance with the present invention mentioned last, since in the image recording step the stimulable phosphor sheet is exposed to a radiation only at the region where image read-out is to be carried out, it becomes possible to prevent unnecessary exposure of the object such as the human body to a radiation.

DESCRIPTION OF THE PREFERRED EMBODIMENTS

The present invention will hereinbelow be described in further detail with reference to the accompanying drawings.

Figure 1:
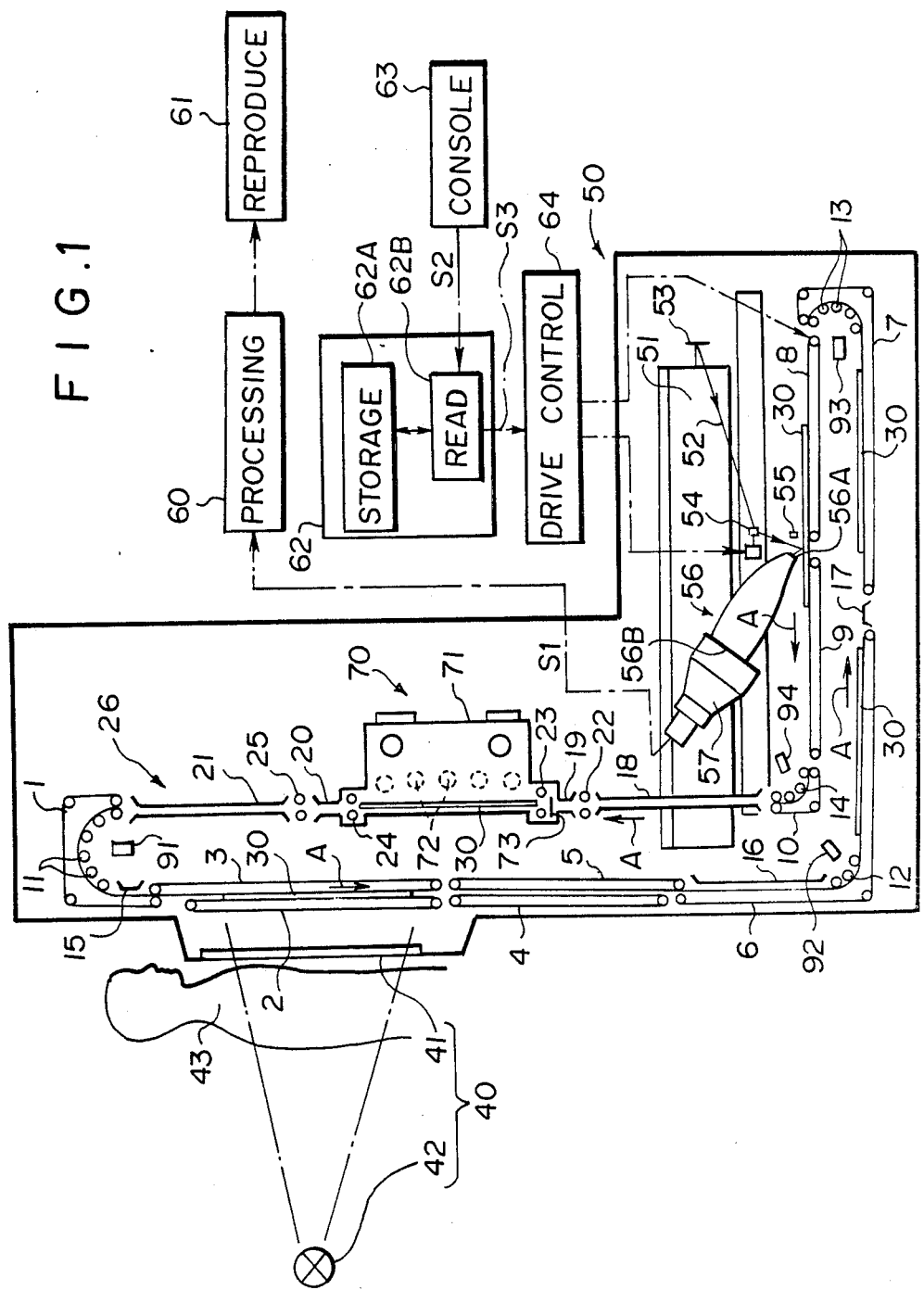
FIG. 1 is a schematic side view showing an embodiment of the radiation image recording and read-out apparatus in accordance with the present invention.

Referring to FIG. 1, an embodiment of the radiation image recording and read-out apparatus in accordance with the present invention is provided with a sheet conveyance circulation path 26 constituted by endless belts 1, 2, 3, 4, 5, 6, 7, 8, 9 and 10, guide rollers 11, 12, 13 and 14 which are rotated respectively by the endless belts 1, 6, 7 and 10, guide plates 15, 16, 17, 18, 19, 20 and 21, and nip rollers 22, 23, 24 and 25. A plurality of (by way of example, five) stimulable phosphor sheets 30, 30, ... are positioned in spaced relation to each other on the circulation path 26 and are conveyed in the direction as indicated by the arrow A by the endless belts 1 to 10 and nip rollers 22, 23, 24 and 25 as the sheet circulation and conveyance means.

The endless belts 2 and 3 are positioned to vertically hold the stimulable phosphor sheet 30 therebetween. An image recording section 40 is constituted by an image recording stand 41 positioned on the left side of the endless belts 2 and 3, and a radiation source 42, e.g. an X-ray source, spaced from the image recording stand 41 to stand face to face with the endless belts 2 and 3. When a radiation image of an object 43 is recorded on the sheet 30, the sheet 30 is held between the endless belts 2 and 3 as shown, and the radiation source 42 is activated with the object 43 standing in front of the image recording stand 41. In this manner, the sheet 30 is exposed to a radiation passing through the object 43 to have a radiation image of the object 43 stored on the sheet 30.

An image read-out section 50 is positioned at the lower section of the circulation path 26. At the image read-out section 50, a laser beam source 51 is positioned above the endless belt 8 constituting a part of the image read-out section 50, and a mirror 53 and a galvanometer mirror 54 are positioned for scanning a laser beam 52 emitted by the laser beam source 51 in the width direction of the sheet 30 placed on the endless belt 8. The galvanometer mirror 54 is swung in both ways to scan the laser beam 52 in the main scanning direction on the sheet 30 carrying the radiation image stored thereon. The sheet 30 which has been subjected to image recording at the image recording section 40 is then conveyed by the sheet circulation and conveyance means to the image read-out section 50. A light guiding reflection mirror 55 and a light guide member 56 are positioned along the main scanning line at the scanning portion of the laser beam 52 on the sheet 30. When the sheet 30 is exposed to the laser beam 52, the sheet 30 emits light in proportion to the stored radiation energy. The light emitted by the sheet 30 directly towards the light guide member 56 and the light emitted by the sheet 30 and reflected by the light guiding reflection mirror 55 enter the light guide member 56 from a light input face 56A thereof, and is guided inside of the light guide member 56 through total reflection to a light output face 56B thereof. The light is thus detected by a photomultiplier 57 connected to the light output face 56B of the light guide member 56. Simultaneously with the scanning of the sheet 30 by the laser beam 52 in the main scanning direction, the sheet 30 is moved by the endless belt 8 in the sub-scanning direction as indicated by the arrow A approximately normal to the main scanning direction, so that the radiation image is read out over the whole surface of the sheet 30. The electric image signal S1 generated by the photomultiplier 57 is sent to an image processing circuit 60 for processing the electric image signal S1. The image signal S1 thus processed is then sent to an image reproducing apparatus 61. The image reproducing apparatus 61 may be a display device such as a CRT, or a device for recording a visible image by point-by-point scanning on a photographic film. Or, the image signal may be stored on a storage means such as a magnetic tape (not shown).

When image read-out is conducted as mentioned above, the reciprocal swinging width and the number of swings of the galvanometer mirror 54, and the sub-scanning movement length of the endless belt 8 corresponding to the number of swings (i.e. the scanning size of the laser beam 52 with respect to the stimulable phosphor sheet 30) are changeable by a drive control circuit 64 which will be described later.

After image read-out is finished, the stimulable phosphor sheet 30 is conveyed by the endless belts 9 and 10 via the guide plate 18, the nip rollers 22, the guide plate 19 and the nip rollers 23 to an erasing section 70 comprising a case 71 and many erasing light sources 72, 72, ..., constituted by fluorescent lamps, arranged within the case 71. After a shutter 73 is opened, the sheet 30 is conveyed into the case 71 by the nip rollers 23. Then, the shutter 73 is closed, and the erasing light sources 72, 72, ... are turned on. The erasing light sources 72, 72, ... mainly emit light having a wavelength within the stimulation wavelength range for the stimulable phosphor constituting the sheet 30. When the sheet 30 is exposed to the erasing light, the radiation energy remaining on the sheet 30 after the image read-out is conducted is released. At this time, since the shutter 73 is closed, no erasing light leaks into the image read-out section 50 and accordingly no noise is generated in the read-out image signal.

After the radiation energy remaining on the stimulable phosphor sheet 30 is erased to such an extent that another image recording on the sheet 30 is possible, the nip rollers 24 are rotated and the sheet 30 is conveyed out of the erasing section 70. Then, the sheet 30 is sent via the guide plate 20 to the nip rollers 25, and then conveyed by the nip rollers 25 along the guide plate 21 onto the endless belt 1 and to the image recording section 40 at which the sheet 30 is reused for image recording.

Adjustment of the scanning size of the laser beam 52, i.e. the image read-out size, by the control section 62 will now be described below. An image recording menu signal S2 is entered, for example, from an operating console 63, into the control section 62. The image recording menu signal S2 represents a combination of the image recording portion of the object with the image recording method or the like, for example, general image recording of the chest or general image recording of the cranium. As mentioned above, the recording range of the object 43 on the stimulable phosphor sheet 30 is approximately fixed by the image recording menu. The control section 62 stores the combinations of the image recording menus with the minimum necessary scanning sizes for the respective image recording menus in a storage means 62A. The image recording menu signal S2 is entered to a read means 62B of the control section 62. Upon receiving the image recording menu signal S2, the read means 62B reads the scanning size corresponding to the image recording menu signal S2 from the storage means 62A, and sends a scanning size designation signal S3 representing the scanning size to the drive control circuit 64 for the galvanometer mirror 54 and the endless belt 8. Upon receiving the scanning size designation signal S3, the drive control circuit 64 controls operations of the galvanometer mirror 54 and the endless belt 8 so that the laser beam 52 scans the stimulable phosphor sheet 30 over the scanning size represented by the scanning size designation signal S3. In this embodiment, the starting point of scanning is maintained constant even though the scanning size of the laser beam 52 is changed.

Figure 2:
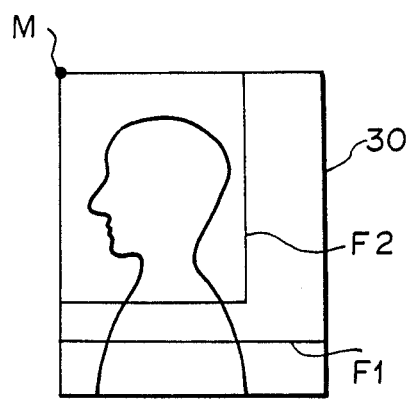
FIG. 2 is an explanatory view showing the stimulating ray scanning range on the stimulable phosphor sheet.

As shown in FIG. 2, in the case where the stimulable phosphor sheet 30 is of the 356 mm×432 mm size, the scanning size is adjusted to the overall area of the sheet 30, i.e. to the 356 mm×432 mm size, the 356mm×356mm size as indicated by F1 smaller than the size of the sheet 30, the 254 mm×305 mm size as indicated by F2, or to some other size. The starting point of scanning is adjusted to a point M at the corner of each size. As mentioned above, combinations of the scanning sizes thus adjusted with the image recording menus like chest general image recording/356mm×356mm, and head general image recording/254mm×305mm are stored in the storage means 62A of the control section 62. The minimum necessary scanning size for an image recording menu is equal to the image recording size optimal for the image recording menu. For example, as indicated by the combination of head general image recording/254mm×305mm, the head general image recording is carried out generally exactly over the 254mm×305mm size as shown in FIG. 2. However, since the stimulable phosphor sheet 30 is larger than the 254mm×305mm size, an image of an object portion outside of the head is also recorded on the sheet 30.

However, when image recording is conducted on the stimulable phosphor sheet 30 carrying an image recorded thereon by the head general image recording, the image recording menu signal S2 representing the head general image recording is entered to the control section 62, and the scanning size designation signal S3 representing the corresponding scanning size, i.e. the 254mm×305mm size, is generated by the control section 62. Therefore, image readout is conducted only over the 254mm×305mm size. Thus, as shown in FIG. 2, even though an image of an object portion outside of the head is stored on the stimulable phosphor sheet 30, said image which need not be reproduced into a visible image is not read out, and the image read-out processing speed becomes high.

The image recording stand 41 should be provided with marks respectively corresponding to a plurality of the scanning sizes as mentioned above, so that the image of an object portion is recorded exactly within each size.

In the aforesaid embodiment, the starting point of scanning is maintained constant even though the scanning size of the laser beam 52 is changed. However, the starting point of scanning may be changed when the scanning size is changed. As will be described in detail below, changing of the starting point of scanning facilitates positioning of the object in the image recording step.

Figure 3:
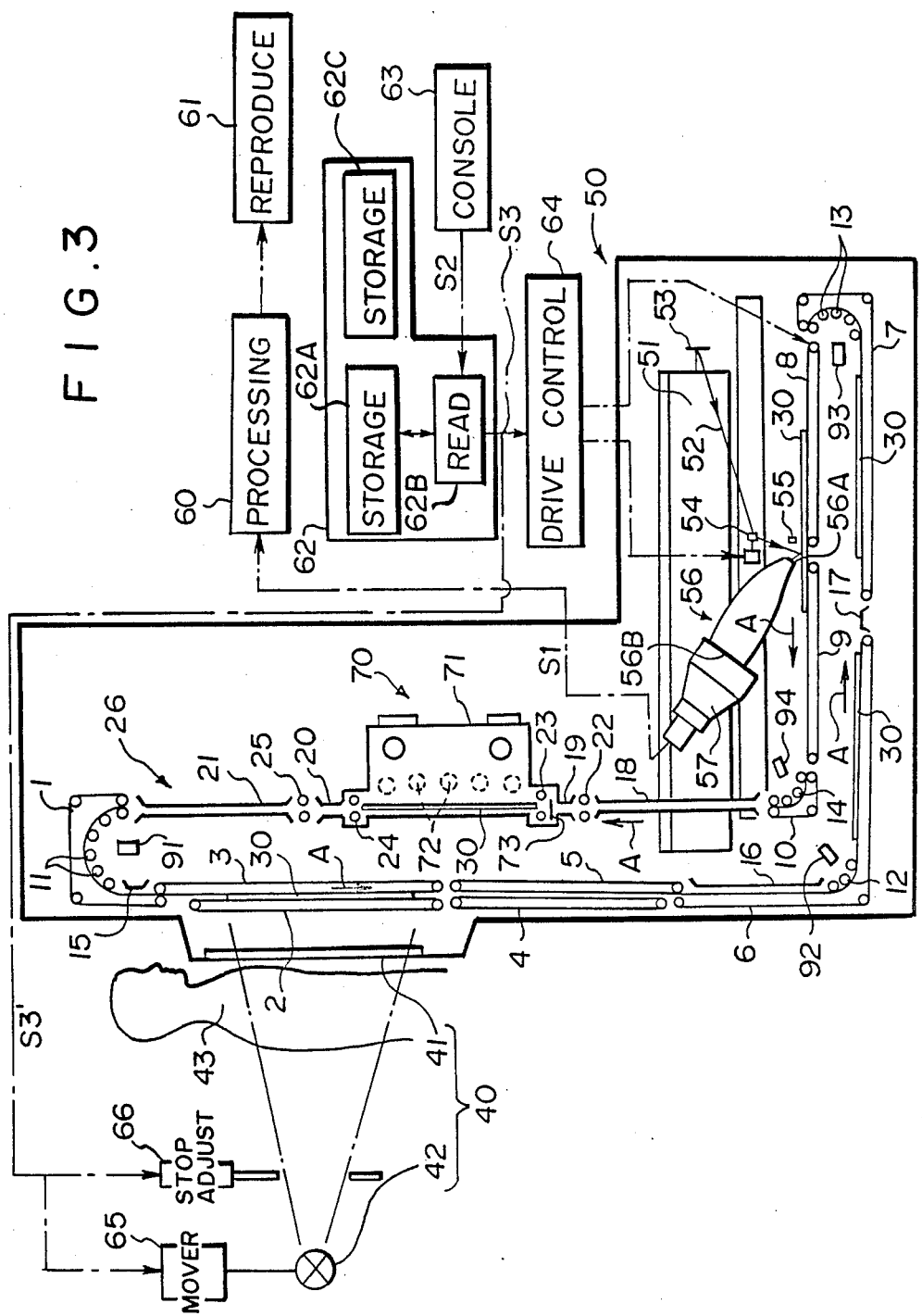
FIG. 3 is a schematic side view showing another embodiment of the radiation image recording and read-out apparatus in accordance with the present invention.

Another embodiment of the radiation image recording and read-out apparatus in accordance with the present invention will now be described with reference to FIG. 3. In FIG. 3, similar elements are numbered with the same reference numerals with respect to FIG. 1. In this embodiment, a radiation source moving means 65 is provided for moving the radiation source 42 vertically and horizontally in a plane parallel with the image recording stand 41, and an irradiation field adjusting means 66 is positioned between the radiation source 42 and the image recording stand 41 for adjusting the irradiation field on the stimulable phosphor sheet 30 positioned at the image recording section 40. The irradiation field adjusting means 66 is constituted by a movable stop plate or the like and adjusts the size and position of the irradiation field on the sheet 30. Like the embodiment of FIG. 1, the galvanometer mirror 54 and the endless belt 8 at the image read-out section 50 are constituted so that the scanning size of the laser beam 52 on the sheet 30 is changeable. However, unlike the embodiment of FIG. 1, they are constituted so that the starting point of scanning may be changed.

Figure 4:
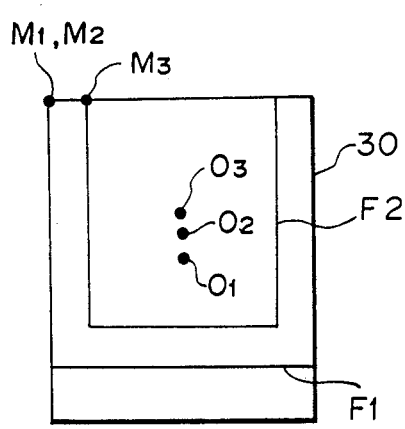
FIGS. 4 and 5 are explanatory views showing the stimulating ray scanning ranges on stimulable phosphor sheets.

In the embodiment of FIG. 3, when image recording is conducted on the stimulable phosphor sheet 30 at the image recording section 40, the image recording menu signal S2 is entered to the control section 62. Upon receiving the image recording menu signal S2, the control section 62 sends a scanning size designation signal S3' representing the scanning size, which is stored in the storage means 62A in combination with the image recording menu represented by the image recording menu signal S2, to the radiation source moving means 65 and the irradiation field adjusting means 66, and stores the scanning size designation signal S3' in a storage means 62C. Upon receiving the scanning size designation signal S3', the irradiation field adjusting means 66 operates to adjust the irradiation field to the scanning size on the stimulable phosphor sheet 30 as shown in FIG. 4. At this time, the adjustment of the irradiation field is effected so that, for example, centers of the irradiation fields in the horizontal direction in FIG. 4 align with each other and the upper sides or the lower sides of the respective irradiation fields coincide with each other. Therefore, centers 01, 02, 03 of the respective recording regions deviate vertically in FIG. 4. When the radiation source moving means 65 receives scanning size designation signal S3', it moves the radiation source 42 to the center 01, 02 or 03 of the recording region adjusted by the scanning size designation signal S3'. Therefore, for example, the head general image recording is conducted over the region of the 254mm×305mm size as indicated by F2 in FIG. 4. In this case, since the irradiation field is adjusted as described above, no image of the object portion outside of the head region is recorded on the stimulable phosphor sheet 30.

The control section 62 detects the sheet conveyance condition, for example, by receiving a signal representing conveyance of the stimulable phosphor sheet 30 from a sheet conveyance control circuit (not shown) for controlling the conveyance and circulation of the sheet 30. When the sheet carrying a radiation image stored thereon as described above is sent to the image read-out section 50 and subjected to image recording, the control section 62 reads the scanning size designation signal S3' stored in the storage means 62C, and sends the signal S3' to the drive control circuit 64 for the galvanometer mirror 54 and the endless belt 8. Upon receiving the scanning size designation signal S3', the drive control circuit 64 controls operations of the galvanometer mirror 54 and the endless belt 8 so that scanning of the sheet 30 with the laser beam 52 is conducted over the scanning size represented by the signal S3' as in the embodiment of FIG. 1. Also, the drive control circuit 64 adjusts the starting point of scanning to M1, M2 or M3 depending on the scanning size so that the scanning with the laser beam 52 is conducted over the recording region positioned as shown in FIG. 4.

Figure 5:
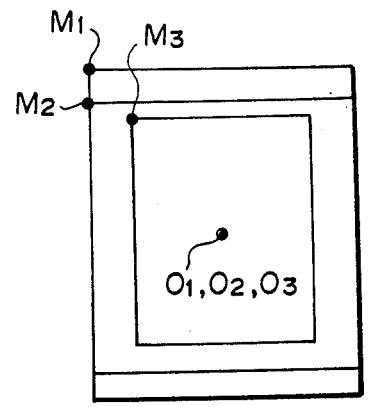

Also in this embodiment, unnecessary read-out is eliminated, and the image read-out processing speed becomes high. Further, since image recording is carried out only over the region where image read-out is conducted by the operation of the irradiation field adjusting means 66, it is possible to avoid unnecessary exposure of the object 43 to the radiation. Since the radiation source 42 is positioned to face the center 01, 02 or 03 of the recording region, it is also possible to prevent distortion from arising at the marginal portions of the recorded image. Further, since the starting point of scanning is changed when the size of scanning with stimulating rays is changed, it is possible to adjust the irradiation field as desired by the irradiation field adjusting means 66 and to facilitate positioning of the object 43 in the image recording step. For example, besides the adjustment of the irradiation field as shown in FIG. 4, it is also possible to adjust the irradiation field so that the centers 01, 02 and 03 of the respective recording regions coincide with each other as shown in FIG. 5. In this case, since the center of image recording region is fixed, for example, at the center of the image recording stand 41 for every recording size, it becomes easier to adjust the position of the object 43.

The starting point of scanning need not necessarily be changed when the size of scanning with stimulating rays is changed. Thus as mentioned with reference to FIG. 1, the starting point of scanning may be maintained constant when the size of scanning with stimulating rays is changed.

In the embodiment of FIG. 1, it is also possible to enter the image recording menu signal S2 to the control section 62 at the time of image recording, store the scanning size designation signal S3 generated thereby in the storage means 62A, read the scanning size designation signal S3 from the storage means 62A when the stimulable phosphor sheet 30 carrying a radiation image stored thereon at the image recording section 40 is then subjected to the image read-out, and send the scanning size designation signal S3 to the drive control circuit 64. Alternatively, the storage means 62A may be omitted, the operator of the apparatus may remember the image recording menu for the stimulable phosphor sheet 30 when image recording is conducted on the sheet 30, and enter the image recording menu signal S2 based on his memory into the control section 62 when the sheet 30 is subjected to the image read-out.

In the embodiments of FIGS. 1 and 3, it may occur that image recording of a type different from the image recording menus stored in the storage means 62A of the control section 62 is carried out, or a radiation image is recorded to a specific size different from general sizes even though the type of image recording comes under the image recording menus stored in the storage means 62A. For the stimulable phosphor sheet 30 on which such image recording is conducted, the image recording menu signal S2 should not be entered to the control section 62. The apparatus should preferably be constituted so that, in this case, image read-out is conducted automatically over the entire area of the stimulable phosphor sheet 30, or conducted over a region adjusted manually.

I claim:
1. A radiation image recording and read-out apparatus, comprising:
(i) a circulation and conveyance means for conveying a plurality of stimulable phosphor sheets for recording a radiation image thereon along a predetermined circulation path;
(ii) an image recording section positioned on said circulation path for recording a radiation image of an object on each of said stimulable phosphor sheets by exposing said stimulable phosphor sheets to a radiation passing through said object;
(iii) an image read-out section positioned on said circulation path and provided with a stimulating ray source for emitting stimulating rays for scanning each of said stimulable phosphor sheets carrying said radiation image stored thereon at image recording section and a photoelectric read-out means for detecting light emitted by said stimulable phos- phor sheet scanned by said stimulating rays to obtain an electric image signal;

(iv) an erasing section positioned on said circulation path for, prior to the next image recording on said stimulable phosphor sheets for which the image read-out has been conducted at said image read-out section, having said stimulable phosphor sheets release the radiation energy remaining on said stimulable phosphor sheets;

a control section including storage means for storing image recording menus representing the portion of the object to be recorded with corresponding stimulating ray scanning sizes;

means for receiving a signal representing one of said image recording menus;

reading means for reading the scanning size corresponding to said image recording menu represented by said signal from said storage means; and means for sending a signal representing said scanning size to said image read-out section, wherein said image read-out section includes means for adjusting said stimulating ray scanning size in response to said scanning size signal such that said stimulating ray scans a portion of said stimulable phosphor sheet corresponding to said scanning size signal.

2. An apparatus as defined in claim 1 wherein said image read-out section comprises alight deflector for scanning said stimulating rays on said stimulable phosphor sheet in a main scanning direction, and a sheet movement means for moving said stimulable phosphor sheet in a sub-scanning direction while said stimulable phosphor sheet is scanned with said stimulating rays in the main scanning direction.

3. An apparatus as defined in claim 2 wherein said image read-out section is constituted to change said stimulating ray scanning size with respect to said stimulable phosphor sheet by controlling the operations of said light deflector and said sheet movement means.

4. An apparatus as defined in claim 1, 2 or 3 wherein said image recording section is provided with marks corresponding to said stimulating ray scanning sizes.

5. The radiation image recording and read-out apparatus of claim 1, wherein said image recording section includes an irradiation field adjusting means for adjusting an irradiation field to a region on said stimulable phosphor sheet where said scanning with said stimulating rays is conducted.

6. An apparatus as defined in claim 5 wherein said image read-out section comprises a light deflector for scanning said stimulating rays on said stimulable phosphor sheet in a main scanning direction, and a sheet movement means for moving said stimulable phosphor sheet in a sub-scanning direction while said stimulable phosphor sheet is scanned with said stimulating rays in the main scanning direction.

7. An apparatus as defined in claim 6 wherein said image read-out section is constituted to change said stimulating ray scanning size with respect to said stimulable phosphor sheet by controlling the operations of said light deflector and said sheet movement means.

8. An apparatus as defined in claim 5 wherein said image recording section is provided with a means for moving a radiation source for emitting said radiation.

9. An apparatus as defined in claim 8 wherein said control section sends said scanning size designation signal also to said radiation source moving means and said irradiation field adjusting means.

10. An apparatus as defined in claim 9 wherein said image read-out section is constituted to change a starting point of said scanning in accordance with said scanning size.

* * * * *